No. 865,704. PATENTED SEPT. 10, 1907.
R. T. HUFFMAN.
AUTOMATIC WAGON BRAKE.
APPLICATION FILED SEPT. 26, 1906.
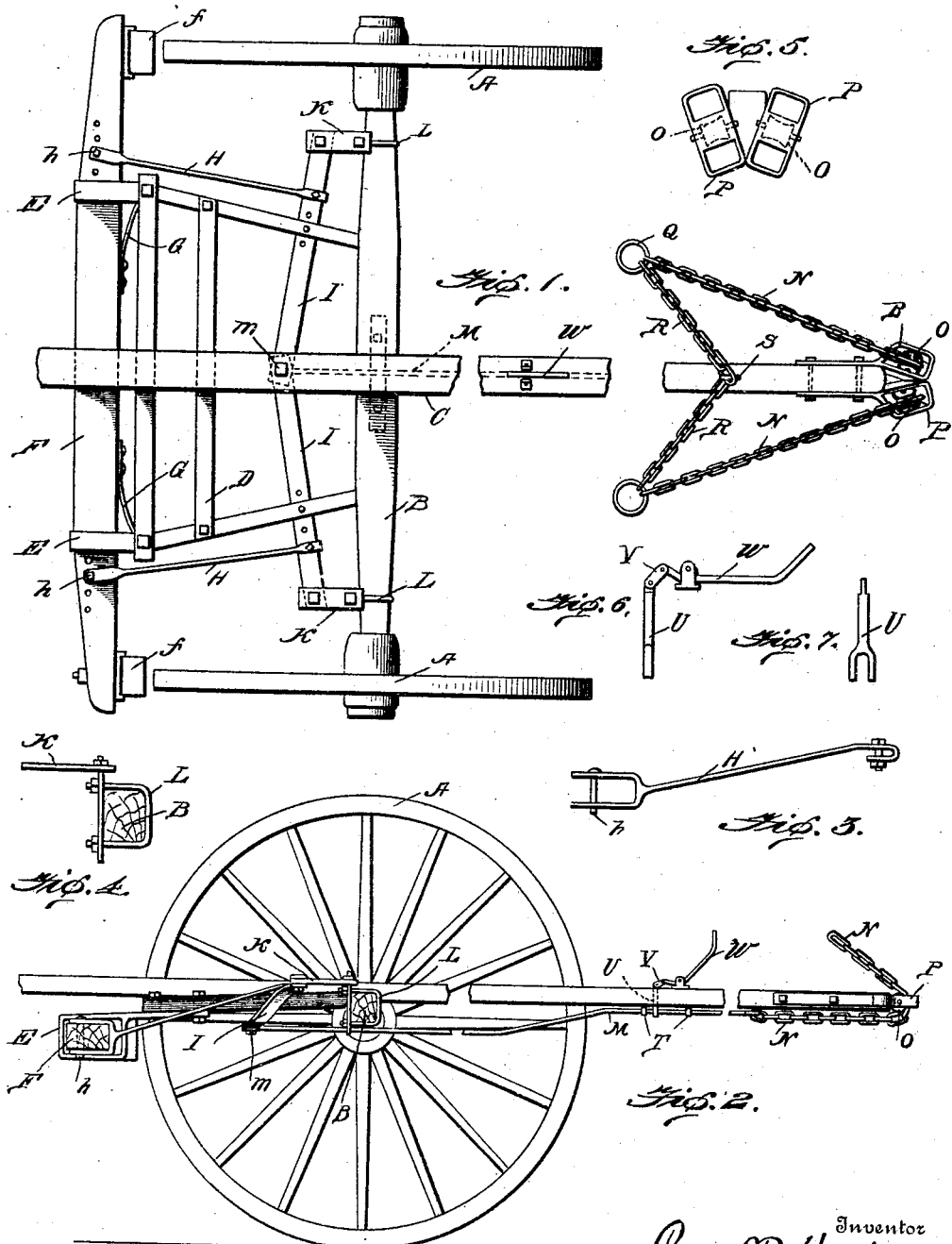

UNITED STATES PATENT OFFICE.

ROY T. HUFFMAN, OF BESSEMER, ALABAMA.

AUTOMATIC WAGON-BRAKE.

No. 865,704.  Specification of Letters Patent.  Patented Sept. 10, 1907.

Application filed September 26, 1906. Serial No. 336,305.

*To all whom it may concern:*

Be it known that I, ROY T. HUFFMAN, a citizen of the United States, residing at Bessemer, in the county of Jefferson and State of Alabama, have invented certain new and useful Improvements in Automatic Wagon-Brakes; and I do hereby declare the following to be a full, clear, and exact description of the same, reference being had to the accompanying drawings, forming a part of this specification, and to the figures and letters of reference marked thereon.

This invention has for its object to provide an automatic brake for animal drawn vehicles, whereby when the draft animals exert a backward push or the vehicle tends to overrun the draft animals, the brake will be applied and the forward movement of the vehicle retarded or checked, said brake being automatically released upon the forward movement of the draft animals or when there is resistance by the vehicle to such movement.

The invention consists primarily in braking devices which are applied to the wheels or other rotary parts through tension on a brake draft rod extending longitudinally of the vehicle tongue and connected through suitable flexible connections with the harness of the draft animals.

The invention further consists in certain novel details of construction and combinations and arrangements of parts all as will be now described and pointed out particularly in the appended claims.

Referring to the accompanying drawings—Figure 1 is a top plan view, partly broken away, of part of the running gear of a vehicle having the present invention applied thereto. Fig. 2 is a side elevation, partly in section, partly broken away and partly in outline, of the gearing shown in Fig. 1. Fig. 3 is a detail elevation showing one of the connecting rods between the brake beam and lever. Fig. 4 is a detail elevation of one of the axle cuffs and lever links. Fig. 5 is a detail front elevation of the sheave frame for the flexible connections at the end of the tongue. Figs. 6 and 7 are details of the clutch or lock for holding the brake mechanism out of operation.

Like letters of reference in the several figures indicate the same parts.

The running gear of the vehicle, a portion of which is shown in outline in the drawing, may be of any well known type or construction, the details of which are immaterial in so far as the present invention is concerned. Suffice it to say that the wheels of the vehicle are indicated by the letter A, the axle by the letter B, the tongue by the letter C and the hounds by the letter D. The rear portion of the hounds D is provided with supporting guides or loops E in which a brake beam F is adapted to slide toward and from the wheels and in rear of the axle. Said brake beam carries at its ends, brake shoes *f* adapted to contact with the rear sides of the front wheels and said brake beam is normally held with the shoes out of contact with the wheels by a spring or springs G.

Extending forwardly from the brake beam and adjustably connected thereto by pins *h* are links H, the forward ends of said links being adjustably connected with brake levers I pivotally connected at their outer ends with lever links K which latter are in turn pivotally connected with axle clips or cuffs L encircling or connected with the axle preferably in proximity to each wheel. The inner ends of the levers I preferably overlap and are jointed together and to the rear end of a brake draft rod M by a bolt or pin *m*. The said draft brake rod M extends forwardly and on the under side of the tongue, being guided and free to move longitudinally with relation to the tongue. At its forward end it is connected with chains or flexible connections N passing around sheaves or pulleys O journaled in a sheave frame P of such form as to both protect the sheaves and form guides for preventing the escape of the chains or flexible connections N. For the purpose stated the said sheaves are preferably set at an angle both with respect to the horizon as shown in Fig. 5 and with respect to the longitudinal center of the tongue as shown in Fig. 1, whereby the chains or flexible connections will render correctly both to the draft rod and to the neck yokes or other suitable hold-back connections with the harness of the draft animals. In the preferred construction and as shown, the said chains or flexible connections N are at their ends flexibly connected by links Q with guide chains R, the latter being connected with the tongue in rear of the sheaves as by a staple S. With this construction, the guide chains R will serve as the means whereby the draft animals may guide the tongue so as to turn the vehicle to one side or the other and at the same time forward pressure on the tongue or relative rearward movement of the draft animals will cause the guide chains to swing toward the tongue itself and thereby pull the upper ends of the chains or flexible connections N rearwardly and tend to draw in a forward direction on the brake draft rod M. Such forward movement of the brake draft rod M swings the brake levers I forwardly and through the links H advances the brake beam and applies the shoes to the wheels, the pressure of the brake shoes on the wheels being proportionate to the relative forward pressure exerted by the vehicle and resisted by the draft animals.

It is obvious that with an arrangement such as described the brake will be applied should an attempt be made to back the vehicle and in order to permit the vehicle to be backed without the application of the brake, as well as to provide for holding the brake out of action when so desired, provision is made for locking the brake draft rod against movement. Such provision preferably takes the form of a clutch or lock adapted to be turned into or out of action by the foot of the driver. As shown, the brake draft rod is provided with an enlargement or shoulder shown at T in Fig. 2, and mounted in the tongue in position to coöperate therewith is a clutch member or fork U Fig. 7 pivotally connected at its upper end through a link V with the rear end of a foot lever W pivotally mounted on the upper side of the tongue. When pressed down to the position indicated in dotted lines in Fig. 2, the lever withdraws the clutch member U from engagement with the brake draft rod M, under which circumstances the brake will operate as before described but when said foot lever is raised or allowed to assume the position shown in full lines in said Fig. 2 the clutch member is in position to coöperate with the shoulder or projection T on the brake draft rod M and hold the same against forward movement with the brake shoes out of contact with the wheels.

The power of the brake may be varied by changing the adjustment or position of the connecting links on the brake beam and levers.

Having thus described my invention, what I claim as new and desire to secure by Letters Patent, is:

1. In an automatic brake for animal drawn vehicles, the combination with the running gear, tongue and brake beam, of a brake rod extending parallel with the tongue and connected with the brake beam at its rear end, a flexible connection at the forward end of said draft rod, a sheave set angularly on the tongue around which said flexible connection passes and a second flexible connection connected with the tongue at a fixed point in rear of said sheave whereby the vehicle may be turned without applying the brake.

2. In an automatic brake for animal drawn vehicles, the combination with the running gear, tongue having angularly placed guide sheaves at its forward end and brake beam, of a brake draft rod extending parallel with the tongue, lever and link connections between the rear end of said draft rod and brake beam, flexible connections with the forward end of said draft rod passing around said sheaves and flexible connections between said first mentioned flexible connections and the tongue in rear of the sheaves; substantially as described.

3. In an automatic brake for animal drawn vehicles, the combination with the running gear embodying an axle, tongue and hounds, of a single brake beam mounted to move bodily on the hounds, brake levers connected at their outer ends by pivotal links with the axle, links connecting said levers and brake beam, a brake draft rod extending longitudinally of the tongue and pivotally connected directly with the inner ends of said levers, sheaves on the forward end of the tongue and flexible connections passing around said sheaves and connected with the forward end of said draft rod; substantially as described.

4. In an automatic brake for animal drawn vehicles, the combination with the running gear embodying an axle, tongue and hounds, of a single brake beam mounted to move bodily on the hounds, brake levers connected at their outer ends by pivotal links with the axle, adjustable links connecting said levers and brake beam, a brake draft rod extending longitudinally of the tongue and pivotally connected directly with the inner ends of said levers, sheaves on the forward end of the tongue and flexible connections passing around said sheaves and connected with the forward end of said draft rod; substantially as described.

ROY T. HUFFMAN.

Witnesses:
G. R. DAVIES,
HENRY A. HURD.